(12) United States Patent
Antoku

(10) Patent No.: US 7,990,137 B2
(45) Date of Patent: Aug. 2, 2011

(54) DEVICE OF EVALUATING MAGNETIC READ HEAD AND METHOD OF EVALUATING MAGNETIC READ HEAD

(75) Inventor: Yosuke Antoku, Tokyo (JP)

(73) Assignee: TDK Corporation, Tokyo (JP)

( * ) Notice: Subject to any disclaimer, the term of this patent is extended or adjusted under 35 U.S.C. 154(b) by 295 days.

(21) Appl. No.: 12/385,054

(22) Filed: Mar. 30, 2009

(65) Prior Publication Data
US 2010/0246042 A1 Sep. 30, 2010

(51) Int. Cl.
*G01R 33/12* (2006.01)
(52) U.S. Cl. .................................................... 324/210
(58) Field of Classification Search ........... 324/210–212
See application file for complete search history.

(56) References Cited

U.S. PATENT DOCUMENTS 6,774,626 B2 * 8/2004 Abe .............................. 324/210
7,075,294 B2 * 7/2006 Matsukuma et al. ........ 324/210

FOREIGN PATENT DOCUMENTS
JP B2-3877386 2/2007

OTHER PUBLICATIONS

Nazarov, Alexey V., et al., "Tunable ferromagnetic resonance peak in tunneling magnetoresistive sensor structures," American Institute of Physics, Applied Physics Letters, vol. 81, No. 24, Dec. 9, 2002, pp. 4559-4561.

* cited by examiner

*Primary Examiner* — Jay M Patidar
(74) *Attorney, Agent, or Firm* — Oliff & Berridge, PLC

(57) ABSTRACT

An MR element having a magnetically free layer and a magnetic bias layer that applies a bias magnetic field to the magnetically free layer are included. Furthermore, a measuring section that measures a ferromagnetic resonance frequency f0 of the magnetically free layer under a condition of applying a predetermined external magnetic field Hm to the magnetically free layer, and an operation section that computes the bias magnetic field Hb according to a following conditional expression (1):

$$Hb = \{(2 \ast \pi \ast f0/\gamma)^2 / Ms\} - (Hk + Hm) \quad (1)$$

where γ is a gyroscope constant, Ms is a saturation magnetic field of the magnetically free layer, and Hk is a shape anisotropy magnetic field of the magnetically free layer.

9 Claims, 7 Drawing Sheets

DEVICE OF EVALUATING MAGNETIC READ HEAD AND METHOD OF EVALUATING MAGNETIC READ HEAD

BACKGROUND OF THE INVENTION

1. Field of the Invention

The present invention relates to a device of evaluating magnetic read head that includes a magnetoresistive element and to a method of evaluating the magnetic read head.

2. Description of the Related Art

A thin film magnetic head, which includes an MR element exhibiting magnetoresistive (MR: Magneto-resistive) effect, is widely used in the past for reading out information written on magnetic recording media such as a hard disk. Recently, a thin film magnetic head utilizing a giant magnetoresistive element (GMR element) that exhibits giant magnetoresistive (GMR: Giant Magneto-resistive) effect is used more generally because of increasing recording density of magnetic recording media. Examples of such GMR element include a spin valve (SV: spin valve) GMR element.

The SV-GMR element has a structure in which a magnetic layer whose magnetization direction is fixed in a given direction (magnetically pinned layer), and a magnetic layer whose magnetization direction is varied in accordance with a signal magnetic field applied from outside (magnetically free layer), are stacked via a nonmagnetic interlayer. In particular, those configured to allow read currents to flow in a direction along the stacked-layer planes of the element during reading operation are called CIP (Current in Plane)-GMR element. Further, a thin film magnetic head including the same is called CIP-GMR head. In this case, electric resistance (namely, voltage) is varied when the read current is applied in accordance with a relative angle between the magnetization directions in the two magnetic layers (the magnetically pinned layer and the magnetically free layer).

Recently, to deal with further improvement in the recording density, CPP-GMR head, which includes a CPP (Current Perpendicular to the Plane)-GMR element in which read currents flow in a direction orthogonal to the stacked-layer planes at the time of reading operation, has been developed. Such CPP-GMR head generally includes a GMR element, a pair of magnetic bias layers that are arranged to face each other in a direction corresponding to a track-width direction with the GMR element in between via an insulating layer, and an upper electrode and a lower electrode that are formed to sandwich the GMR element and the pair of magnetic bias layers in between along a stacking direction. The upper and lower electrodes also serve as top and bottom shielding layers. Such CPP-GMR head recognizes an advantage in that higher output is obtainable even when reducing the dimension of element in the track-width direction, as compared with the CIP-GMR head. Namely, in the CIP-GMR head, since read currents flow in the in-plane direction, dimensional reduction in the track-width direction results in the narrowness of magnetic sensitive area through which read currents pass, thereby decreasing the amount of change in voltage. To the contrary, since read currents pass through the CPP-GMR head in the stacking direction, the dimensional reduction in the track-width direction less affects the amount of voltage changes. For this reason, the CPP-GMR head is advantageous compared with the CIP-GMR head from the standpoint of the reduction of track density, represented by the number of tracks per inch (TPI: Tracks Per Inch). What is more, since insulating layers do not have to be provided between the CPP-GMR element and the respective top/bottom shielding layers, the reduction, by the thickness thereof, of the linear recording density represented by BPI (bit per inch) is possible, as compared with the CIP-GMR head.

There is also a tunnel MR element (TMR element) that is configured to read currents flow in the direction orthogonal to the stacked-layer planes, as in the CPP-GMR element. The TMR element includes an ultra-thin insulating layer called a tunnel barrier layer, and much higher resistance change ratio than that of the above-mentioned CPP-GMR element is obtainable. For this reason, a thin film magnetic head including the TMR element (TMR head) is highly expected to be capable of dealing with a further improvement in recording density.

Though the thin film magnetic head including such a CIP-GMR element, a CPP-GMR element or a TMR element is suitable for reading from the magnetic recording medium on which high density recording is performed, instability of reading performance caused by what is called a Barkhausen noise is yet worried. The Barkhausen noise is a discontinuous noise produced when a magnetic wall of the magnetically free layer made of soft ferromagnetic material moves discontinuously due to structural defect inside the magnetically free layer or the like. The thin film magnetic head producing such a Barkhausen noise lacks reliability in its reading operation. For this reason, in general, magnetic bias layers (magnetic domain controlling layers) are arranged on both neighboring sides of the magnetically free layer along the track-width direction, for the purpose of suppressing the Barkhausen noise, as stated above. The magnetic bias layer is made of a permanent magnet etc., and functions to promote single domainization of the magnetically free layer by applying a longitudinal bias field to the magnetically free layer in the track-width direction.

As mentioned above, a predetermined longitudinal bias field needs to be applied to the magnetically free layer to suppress the Barkhausen noise. For this reason, precise evaluation of the magnetic characteristics (such as coercive force, squareness ratio) of the magnetic bias layer in a thin film magnetic head is required. Accordingly, in the past, the change in the resistance value is measured while applying an external magnetic field to the thin film magnetic head in the application direction of the longitudinal bias field (track-width direction), as can be seen in the Japanese Patent No. 3877386 gazette, for example. In this case, since the external magnetic field and the longitudinal bias field are balanced with each other at a minimum (or maximum) resistance value, the external magnetic field at that time is regarded as the coercive force of the magnetic bias layer.

SUMMARY OF THE INVENTION

However, the method of the above-mentioned Japanese Patent No. 3877386 gazette requires a long time for measurement. Moreover, when the magnetic shielding layer in the thin film magnetic head to be measured is magnetically unsaturated, it is difficult to obtain the coercive force of the magnetic bias layer accurately.

Therefore, it is desirable to achieve a device of evaluating magnetic read head and a method of evaluating the magnetic read head capable of evaluating magnetic characteristics of the magnetic bias layer in the magnetic read head more simply and with higher precision.

An embodiment of a device of evaluating a magnetic read head according to the present invention evaluates the magnetic read head having a magnetoresistive element including a magnetically free layer, and a magnetic bias layer that applies a bias magnetic field to the magnetically free layer, and includes: a measuring section measuring a ferromagnetic resonance frequency of the magnetically free layer under a condition of applying a predetermined external magnetic field to the magnetically free layer; and an operation section computing the bias magnetic field according to a conditional equation (1), $$Hb=\{(2*\pi*f0/\gamma)^2/Ms\}-(Hk+Hm) \quad (1)$$

where Hb is the bias magnetic field, f0 is the ferromagnetic resonance frequency of the magnetically free layer, γ is a gyroscope constant, Ms is a saturation magnetic field of the magnetically free layer, Hk is a shape anisotropy magnetic field of the magnetically free layer, and Hm is the external magnetic field applied to the magnetically free layer.

An embodiment of a method of evaluating a magnetic read head according to the present invention evaluates the magnetic read head having a magnetoresistive element including a magnetically free layer, and a magnetic bias layer that applies a bias magnetic field to the magnetically free layer, and includes: measuring a ferromagnetic resonance frequency of the magnetically free layer under a condition of applying a predetermined external magnetic field to the magnetically free layer; and computing the bias magnetic field according to a conditional equation (1), $$Hb=\{(2*\pi*f0/\gamma)^2/Ms\}-(Hk+Hm) \quad (1)$$

where Hb is the bias magnetic field, f0 is the ferromagnetic resonance frequency of the magnetically free layer, γ is a gyroscope constant, Ms is a saturation magnetic field of the magnetically free layer, Hk is a shape anisotropy magnetic field of the magnetically free layer, and Hm is the external magnetic field applied to the magnetically free layer.

In the embodiments of the device and the method of evaluating the magnetic read head according to the present invention, the bias magnetic field applied by the magnetic bias layer is obtained with sufficient reproducibility, based on the result of the direct measurement of the ferromagnetic resonance frequency, which is a specific characteristic unique to the magnetically free layer.

Therefore, according to the embodiments of the device and the method of evaluating the magnetic read head of the present invention, the magnetization curve of the magnetic bias layer can be obtained more correctly and in a comparatively short time without depending on other component elements such as a magnetic shielding layer. Namely, magnetic characteristics of the magnetic bias layer can be evaluated simply and with high precision.

Also, according to an embodiment of the device of evaluating the magnetic read head of the present invention, an output section outputting a relationship between the external magnetic field and the bias magnetic field may be further provided. In addition, for example, a magnetic field application section applying the external magnetic field to the magnetic read head, and a spectrum analyzer measuring the frequency dependence of an output voltage outputted from the magnetic read head, are provided as the measuring section. It is preferable that the measuring section further include a waveform formation section removing a direct-current component of the output voltage outputted from the magnetic read head between the magnetic field application section and the spectrum analyzer. Also, it is preferable that the magnetic field application section include four electromagnets separately disposed to surround the magnetic read head, and each of the electromagnets be configured of a magnetic core and a coil wound around the magnetic core. This is because external magnetic fields can be efficiently generated in a desired direction while keeping a compact configuration.

According to an embodiment of the method of evaluating the magnetic read head of the present invention, it is preferable to perform remagnetization of the magnetic bias layer by arranging a magnetization direction of the magnetic bias layer in one direction before measuring the ferromagnetic resonance frequency of the magnetically free layer. In addition, it is preferable that the ferromagnetic resonance frequency of the magnetically free layer be measured under a condition of applying a predetermined voltage to the magnetoresistive element. In this manner, the magnetic characteristics of the magnetic bias layer can be measured more accurately. Further, determination on adequacy of the magnetic bias layer becomes easier, by obtaining a squareness ratio and coercive force of the magnetic bias layer, based on a hysteresis loop that represents a relationship between the bias magnetic field calculated according to the conditional expression (1) and the external magnetic field that is applied in measuring the ferromagnetic resonance frequency of the magnetically free layer.

Other objects, features and effects of the present invention will be explained as necessary in the following descriptions.

DETAILED DESCRIPTION OF THE PREFERRED EMBODIMENTS

Embodiment of the present invention will be described in detail hereinbelow with reference to the drawings.

First, a device of evaluating magnetic read head according to one embodiment of the present invention will be described with reference to FIG. 1.

Figure 1:
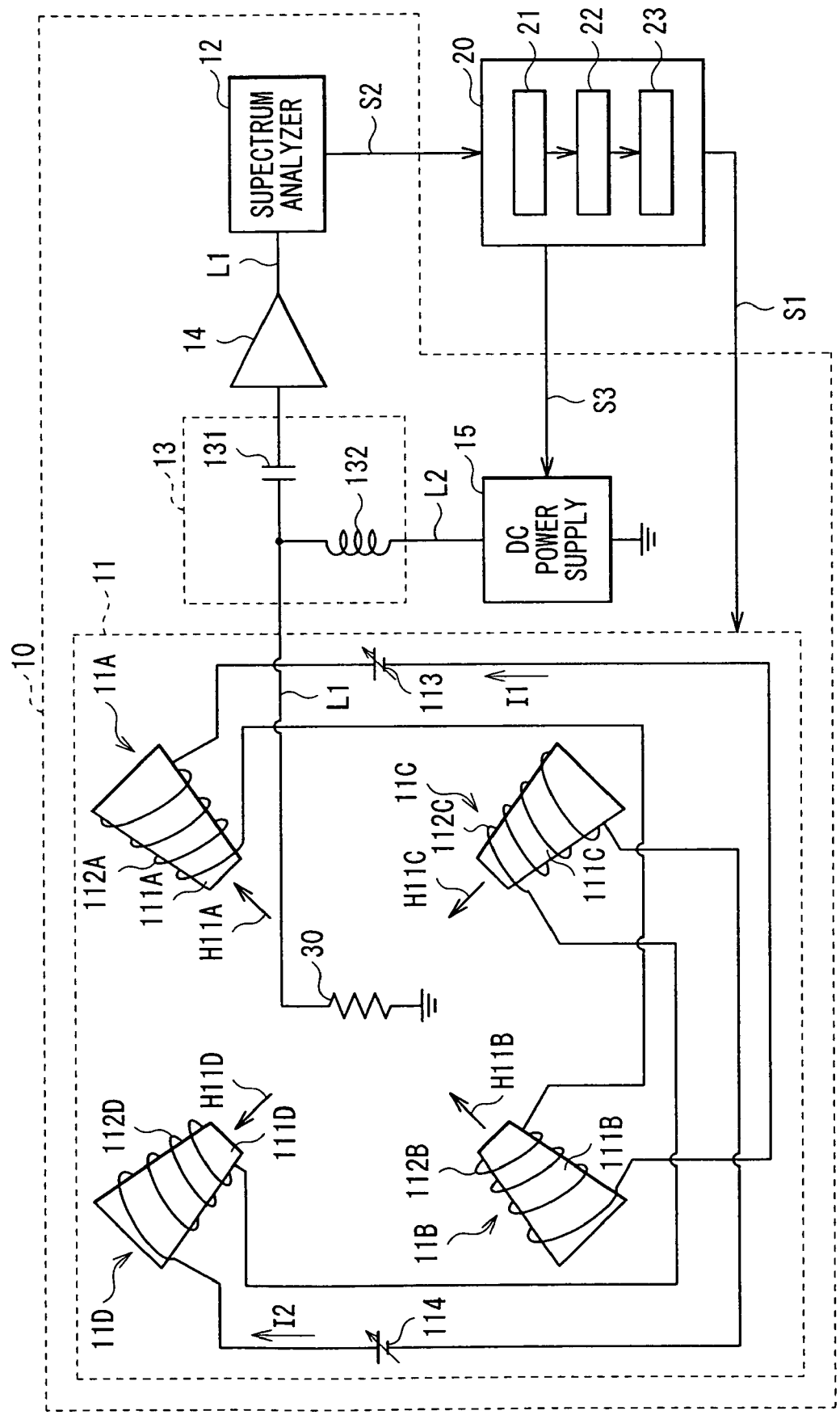
FIG. 1 is a schematic diagram illustrating a configuration of a device of evaluating magnetic read head according to one embodiment of the present invention.

FIG. 1 illustrates a configuration of the device of evaluating magnetic read head (hereinafter simply referred to as evaluation device) according to the present embodiment. The evaluation device evaluates a magnetic read head 30. The magnetic read head 30 has, as mentioned later, a magnetoresistive (MR: Magnetoresistive) effect element (hereinafter referred to as MR element) 31 (which will be described later) including a magnetically free layer 45 (which will be described later) whose magnetization direction is varied according to an external magnetic field, and a magnetic bias layer 352 (which will be described later) that applies a bias magnetic field to the magnetically free layer 45. The evaluation device evaluates the magnetic characteristics (for example, coercive force, squareness ratio, etc.) of the magnetic bias layer 352 in particular. Details of the magnetic read head 30 will be described later.

The evaluation device includes a measuring section 10 that measures the magnetic characteristics of the magnetic bias layer 352, and a control unit 20 that controls the operation of the measuring section 10.

The measuring section 10, under a condition of applying a predetermined external magnetic field to the magnetically free layer 45, measures the ferromagnetic resonance frequency f0 of the magnetically free layer 45 corresponding thereto. Specifically, the measuring section 10 has a magnetic field application section 11 for applying an external magnetic field to the magnetic read head 30, and a spectrum analyzer 12 for measuring the frequency dependence of the output voltage outputted from the magnetic read head 30. Between the magnetic field application section 11 and the spectrum analyzer 12 is disposed a waveform formation section 13 and an amplifier 14 in order from the side of the magnetic field application section 11. In addition, a DC power supply 15 connected to the waveform formation section 13 is disposed in the measuring section 10. The magnetic field application section 11, the spectrum analyzer 12, and the DC power supply 15 are connected to the control unit 20 via signal lines S1 to S3 respectively.

The magnetic field application section 11 has four electromagnets 11A to 11D disposed to surround the magnetic read head 30 located in the center thereof. Each of the electromagnets 11A to 11D is configured of a core 111 (111A to 111D) of a truncated cone in shape extending in its height direction, and a coil 112 (112A to 112D) wound around the core 111. Here, the electromagnet 11A and the electromagnet 11B are arranged to face each other, whereas the electromagnet 11C and the electromagnet 11D are arranged to face each other in the direction orthogonal to a direction connecting the electromagnet 11A and the electromagnet 11B. The coil 112A of the electromagnet 11A and the coil 112B of the electromagnet 11B form a series circuit with a power supply 113. Similarly, the coil 112C of the electromagnet 11C and the coil 112D of the electromagnet 11D form a series circuit with a power supply 114. Both of the power supplies 113 and 114 are output-variable DC power supplies that supply direct currents I1 to the coils 112A and 112B and direct currents I2 to the coils 112C and 112D respectively.

The electromagnets 11A to 11D generate induced magnetic fields H11A to H11D, respectively, by the direct currents I1 and I2 flowing through the coil 112 so as to pierce through the core 111 in its height direction. At that time, by modulating the intensity balance of the induced magnetic fields H11A to H11D, an external magnetic field of a desired direction (for example, a track-width direction (an X-axis direction as indicated in the after-mentioned FIG. 2)) can be applied to the magnetic read head 30. Here, it is desirable that the induced magnetic field H11A and the induced magnetic field H11B be generated in a same direction, and the induced magnetic field H11C and the induced magnetic field H11D be generated in a same direction. In particular, the generating direction of the induced magnetic fields H11A and H11B and the generating direction of the induced magnetic fields H11C and H11D may be approximately orthogonal to each other, since this makes it easier to modulate the direction and intensity of the external magnetic field that is applied to the magnetic read head 30. The magnetic field application section 11 is connected to the control unit 20 through the signal line S1, and the direction and intensity of the external magnetic fields are modulated by controlling the amount of the direct currents I1 and I2 in accordance with the signal from the control unit 20.

The magnetic read head 30 is disposed approximately in the center of a region surrounded by the four electromagnets 11A to 11D while being electrically insulated therefrom. Here, one of a pair of electrodes (a bottom shielding layer 32 and a top shielding layer 34 as described later) is grounded, and the other electrode is connected to the lead wire L1 via a probe (not illustrated).

The spectrum analyzer 12 measures the frequency dependence of the output voltage outputted from the magnetic read head 30 under a condition in which the external magnetic field of a desired direction is being applied to the magnetic read head 30, and obtains the spectrum waveform of the magnetically free layer 45, thereby obtaining the ferromagnetic resonance frequency f0 of the magnetically free layer 45. The spectrum analyzer 12 is connected to the magnetic read head 30 via the waveform formation section 13 and the amplifier 14 by the lead wire L1. On the other hand, the spectrum analyzer 12 is connected to the control unit 20 by the signal line S2.

The waveform formation section 13 is what is called a bias tee (Bias-Tee), and removes the direct-current component from the output voltage outputted from the magnetic read head 30. The waveform formation section 13 has a capacitor 131 provided on the lead wire L1, and a coil 132 one end of which is connected between the magnetic read head 30 and the capacitor 131. The other end of the coil 132 is connected to the DC power supply 15 by a lead wire L2.

The amplifier 14 is provided on the lead wire L1, and amplifies the output voltage signal whose direct-current component has been removed and outputted from the waveform formation section 13 (about 50 to 100 times, for example)

The DC power supply 15 functions so as to apply a bias voltage to the magnetic read head 30 via the waveform formation section 13 by operational control given by the control unit 20. The DC power supply 15 is connected to the waveform control section 13 (to the coil 132 thereof) via the lead wire L2 while also connected to the control unit 20 via the signal line S3.

The control unit 20 includes a data storing section 21, an operation section 22, and an output section 23. The data storing section 21 stores measurement data (data of ferromagnetic resonance frequency f0 of the magnetically free layer 45 and data of external magnetic field Hm corresponding thereto) obtained from the spectrum analyzer 12. The operation section 22 calculates a bias magnetic field Hb applied to the magnetically free layer 45 from the magnetic bias layer 352, according to the following conditional expressions (1) where, in the conditional expression (1), f0 is ferromagnetic resonance frequency of the magnetically free layer 45, γ is gyroscope constant, Ms is saturation magnetic field of the magnetically free layer 45, Hk is shape anisotropy magnetic field of the magnetically free layer 45, and Hm is external magnetic field applied to the magnetically free layer 45 when the ferromagnetic resonance frequency f0 is measured. It is to be noted that the gyroscope constants, the saturation magnetic field Ms, and the shape anisotropy magnetic field Hk are fixed values determined based on the component materials of the magnetically free layer 45 and its shape, and can be measured in advance for each.

$$Hb=\{(2*\pi*f0/\gamma)^2/Ms\}-(Hk+Hm) \quad (1)$$

The output section 23 outputs the relationship between the external magnetic field Hm applied to the magnetically free layer 45 in measuring the ferromagnetic resonance frequency f0 and the bias magnetic field Hb.

According to the evaluation device of the present embodiment, it is possible to compute the bias magnetic field Hb applied by the magnetic bias layer 352 with good reproducibility, based on results obtained by directly measuring the ferromagnetic resonance frequency f0 in the measuring section 10, which is a specific characteristic unique to the magnetically free layer 45.

Next, configuration of the magnetic read head 30 to be evaluated will be explained with reference to FIG. 2.

The magnetic read head 30 is mounted in a hard disk drive (not illustrated), together with a magnetic recording medium (not illustrated) for example, and reads magnetic information written on the magnetic recording medium. Here, the magnetic read head 30 may be configured integrally with a magnetic write head that writes magnetic information on the magnetic recording medium.

Figure 2:
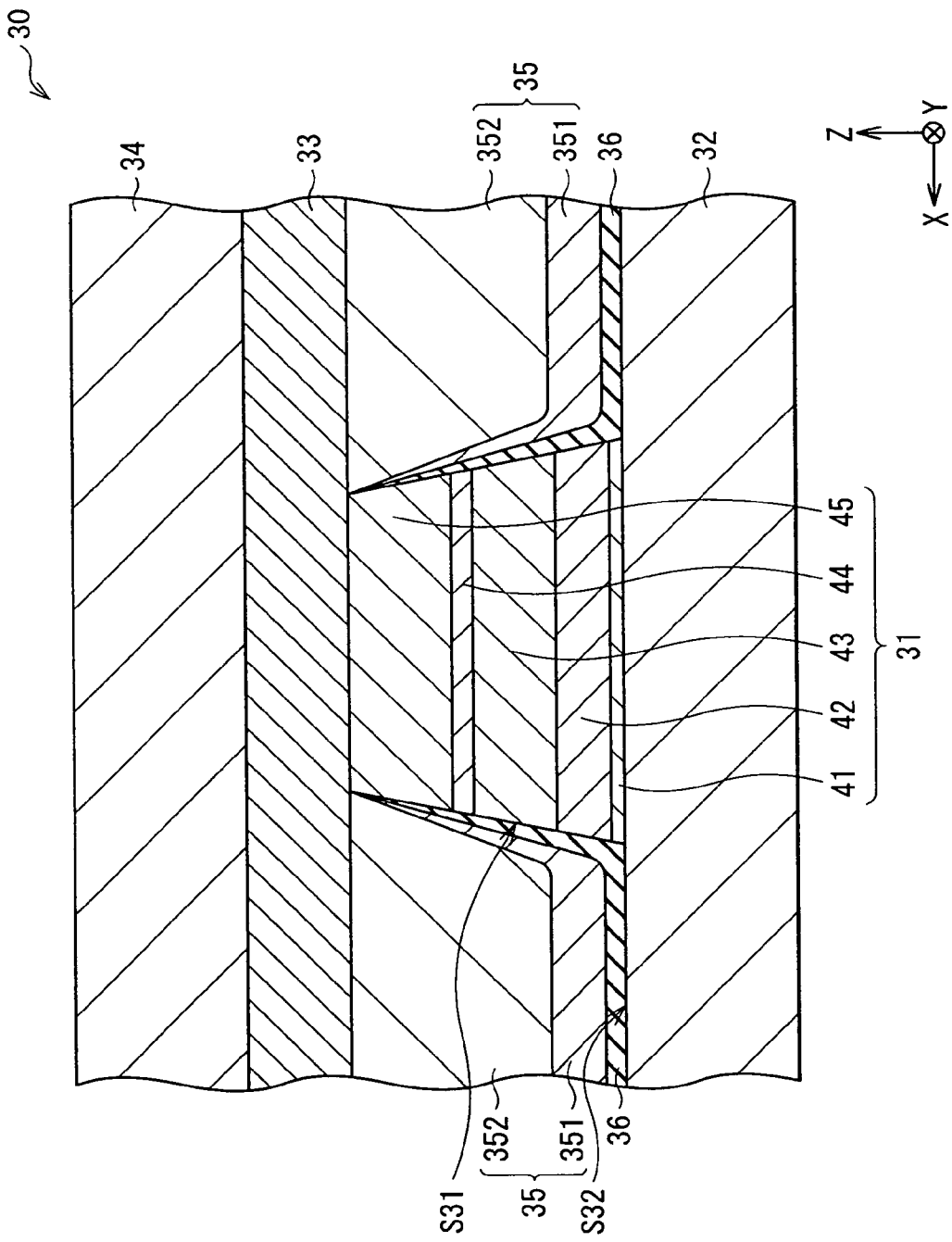
FIG. 2 is a sectional view illustrating a cross section structure in the magnetic read head of FIG. 1, which is exposed to a recording-medium-facing-surface.

FIG. 2 is an enlarged view illustrating a cross section structure of the magnetic read head 30 that is exposed to a recording-medium-facing-surface (ABS). As illustrated in FIG. 2, the magnetic read head 30 includes a magnetoresistive (MR: Magnetoresistive) element (hereinafter referred to as MR element) 31 having the CPP (Current Perpendicular to the Plane) structure configured so that sense currents flow in a layer-stacking direction. More specifically, the magnetic read head 30 has a structure in which a bottom shielding layer 32, the MR element 31, a gap adjustment layer 33, and a top shielding layer 34 are stacked in order on the substrate (not illustrated) via an insulating layer (not illustrated), for example.

A pair of magnetic domain controlling layers 35 that give a bias magnetic field to the MR element 31 are disposed on both neighboring sides, in the track-width direction (the X-axis direction) of the magnetic recording medium, of the MR element 31, in a space sandwiched between bottom and top shielding layers 32 and 34, via an insulating layer 36. The insulating layer 36 continuously covers from an upper surface S32 of the bottom shielding layer 32 to the both side-faces S31, in the track-width direction, of the MR element 31. The insulating layer 36 further occupies a space corresponding to the MR element 31 in the rear part of the MR element 31 (side opposite to the recording-medium-facing-surface). Thereby, a sense current path is defined correctly and sense currents are prevented from leaking out of the MR element 31 to other parts.

The bottom shielding layer 32 and the top shielding layer 34 are formed to the thickness of 0.03 μm to 3 μm respectively, and made of a soft magnetic metal material such as nickel iron alloy (NiFe), for example. These bottom shielding layer 32 and top shield layer 34 are facing each other with the MR element 31 in between in the layer-stacking direction (the direction of Z), and function to prevent the MR element 31 from being affected by unnecessary magnetic fields. Further, the bottom shielding layer 32 and the top shielding layer 34 are connected to terminals (not illustrated) respectively, and also function as electrodes for applying current to the MR element 31 in the layer-stacking direction (the direction of Z).

The MR element 31 has a structure in which multiple metal layers containing a magnetic material are stacked, and functions as a sensor part to read magnetic information written on the magnetic recording medium. Specifically, a foundation layer 41, an antiferromagnetic layer 42, a magnetically pinned layer 43, an intervening layer 44, and a magnetically free layer 45 are stacked in order from the side of the bottom shielding layer 32.

The foundation layer (also referred to as a buffer layer) 41 has a structure in which, for example, a tantalum (Ta) layer and a NiFe layer or nickel chrome alloy (NiCr) are stacked in order from the side of the bottom shielding layer 32. The foundation layer 41 functions such that exchange coupling between the antiferromagnetic layer 42 and the magnetically pinned layer 43 is performed favorably.

The antiferromagnetic layer 42 is made of a material exhibiting antiferromagnetism such as platinum manganese alloy (PtMn) or iridium manganese alloy (IrMn). The antiferromagnetic layer 42 functions as what is called a pinning layer that fixes the magnetization direction of the magnetically pinned layer 43.

The magnetically pinned layer 43, which is called a pinned layer, is made of a ferromagnetic material such as a cobalt iron alloy (CoFe), and its magnetization direction is fixed by the antiferromagnetic layer 42. The magnetically pinned layer 43 may have either a single layer structure or trilaminar structure what is called a synthetic structure. The magnetization direction of the magnetically pinned layer 43 is set along the direction orthogonal to the recording-medium-facing-surface (the direction of Y), for example.

The intervening layer 44 is made of a nonmagnetic metal material having comparatively high electric conductivity (electric resistance is small), and may have either a single layer structure or a multilayer structure. The intervening layer 44 mainly functions to cut-off the magnetic coupling between the magnetically free layer 45 and the magnetically pinned layer 43.

The magnetically free layer 45 has a magnetization direction which varies according to a signal magnetic field applied from the magnetic recording medium, and may have either a single layer structure or multilayer structure containing a ferromagnetic material, such as nickel iron alloy (NiFe) and cobalt iron alloy (CoFe).

A pair of magnetic domain controlling layers 35 have a double layer structure in which a buffer layer 351 and the magnetic bias layer 352 are stacked in order on the insulating layer 36 respectively, and are electrically insulated from the MR element 31 and the bottom shielding layer 32 with the insulating layer 36 surrounding the periphery thereof. The buffer layer 351, which is made of any of a simple chromium, a chromium titanium alloy (CrTi) and a simple tantalum, for example, and functions to promote the crystal growth of the magnetic bias layer 352 in the course of production and improve lattice matching with the component materials of the magnetic bias layer 352, thereby raising the coercive force of the magnetic bias layer 352. The magnetic bias layer 352 may be a single layer structure made of a ferromagnetic material containing, for example, cobalt, such as cobalt platinum alloy (CoPt) and cobalt chrome platinum alloy (CoCrPt), or may be a multilayer structure including a layer made of such ferromagnetic materials, and controls the magnetic domain structures of the magnetically free layer 45 by applying a bias magnetic field to the magnetically free layer 45 in the track-width direction. A cap layer (not illustrated) may be further disposed between the magnetic bias layer 352 and the gap adjustment layers 33. It is preferable that the cap layer covering the magnetic bias layer 352 be made of a material excellent in lattice matching with CoPt or CoCrPt and prone to promote crystallization of the magnetic bias layer 352, such as chromium, CrTi, chromium molybdenum alloy (CrMo), chromium tungsten alloy (CrW), titanium tungsten alloy (TiW), tungsten (W), ruthenium (Ru), ruthenium chromium alloy (RuCr), and platinum chromium alloy (PtCr). In the magnetic read head 30, the upper surface of the magnetic bias layer 352 is aligned to the upper surface of the MR element 31. Thereby, not only the surface smoothness of the gap adjustment layer 33 and the top shielding layer 34 is secured (thereby increasing the shielding effect) but also a space area occupied by the magnetic bias layer 352 can be enlarged to increase the magnitude of the bias magnetic field applied to the MR element 31.

The gap adjustment layer 33 covers both of the MR element 31 and the magnetic domain controlling layer 35, and is, for example, made of a nonmagnetic material of high conductivity, such as ruthenium and tantalum. The gap adjustment layer 33 can optimize a read gap, optimize a gap between the magnetically free layer 45 and the top shielding layer 34, or can be used to further improve the surface smoothness of the undersurface of the top shielding layer 34 (the side nearer to the MR element 31).

Next, reading operation of the magnetic read head 30 will be described with reference to FIG. 2. The magnetic read head 30 reads information written on a magnetic recording medium by utilizing variation of the electric resistance of the MR element 31 in accordance with a signal magnetic field applied from the magnetic recording medium.

When the read magnetic head 30 reads information written on the magnetic recording medium, a sense current is first applied to the MR element 31 through the bottom shielding layer 32 and the top shielding layer 34 in the layer-stacking direction (the direction of Z). Namely, sense current is applied inside the MR element 31 from the foundation layer 41 through the antiferromagnetic layer 42, the magnetically pinned layer 43, the intervening layer 44 and the magnetically free layer 45 in this order or vice versa. Here, when the signal magnetic field is applied from the magnetic recording medium, the magnetization direction of the magnetically free layer 45 turns to change its direction in accordance with the direction and magnitude of the signal magnetic field, whereas the magnetization of the magnetically pinned layer 43 is fixed to a certain direction by the antiferromagnetic layer 42. Accordingly, relative direction of magnetizations between the magnetically free layer 45 and the magnetically pinned layer 43 is changed. Such variation in magnetization state in accordance with the variation of signal magnetic fields causes a change in the spin accumulation of conduction electrons when sense currents are passing through the MR element 31 in its layer-stacking direction, resulting in a change of the electric resistance of the MR element 31. Since such change of the electric resistance brings about a change of output voltage, it becomes possible to read the information written on the magnetic recording medium by detecting the current variation.

Subsequently, the method of evaluating the magnetic read head using the evaluation device of the present embodiment will be explained with reference to FIGS. 3, 4, 5A to 5D in addition to FIGS. 1 and 2.

Figure 3:
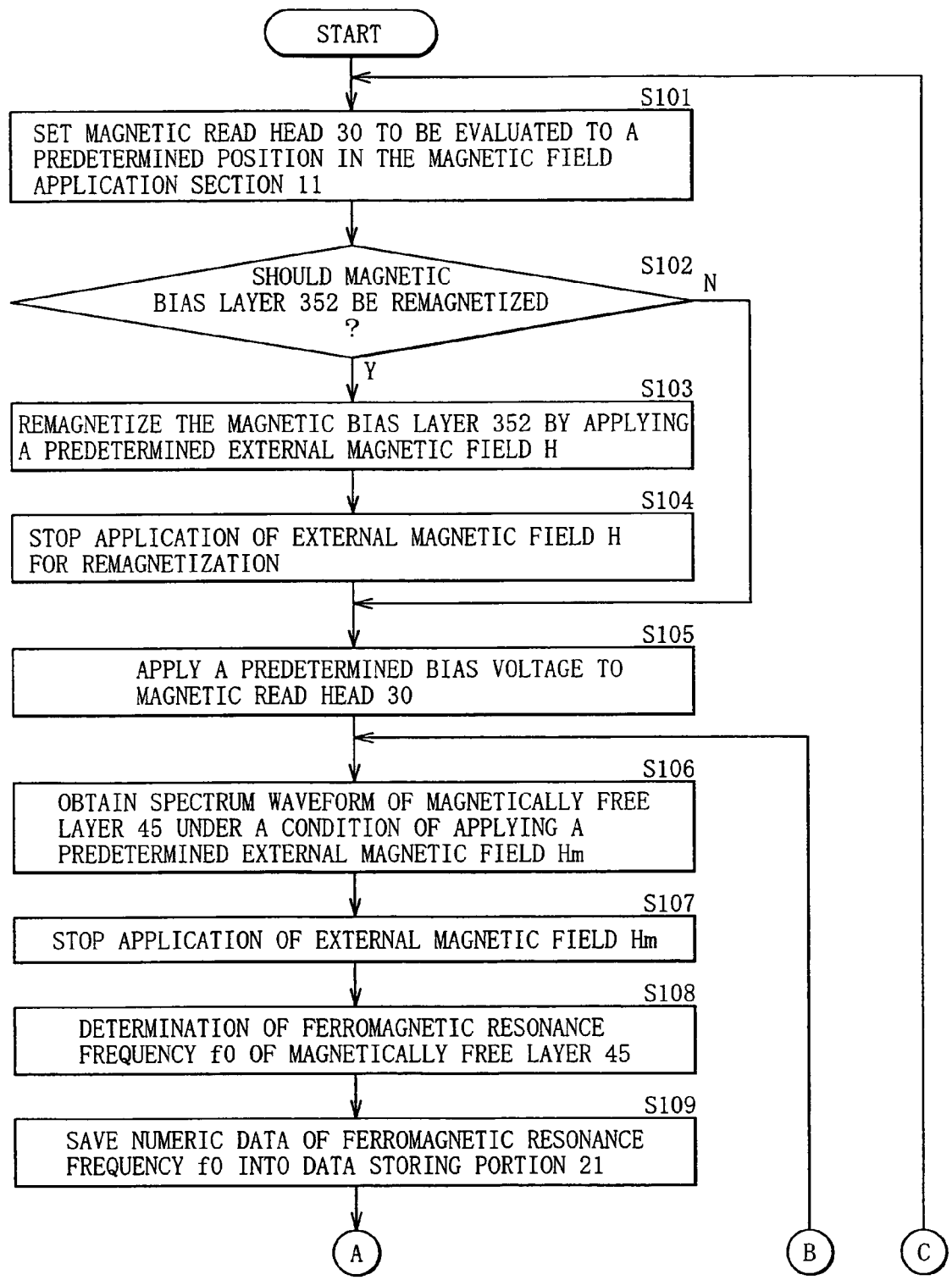
FIG. 3 is a flow chart explaining the method of evaluating the magnetic read head using the evaluation device of FIG. 1.
Figure 4:
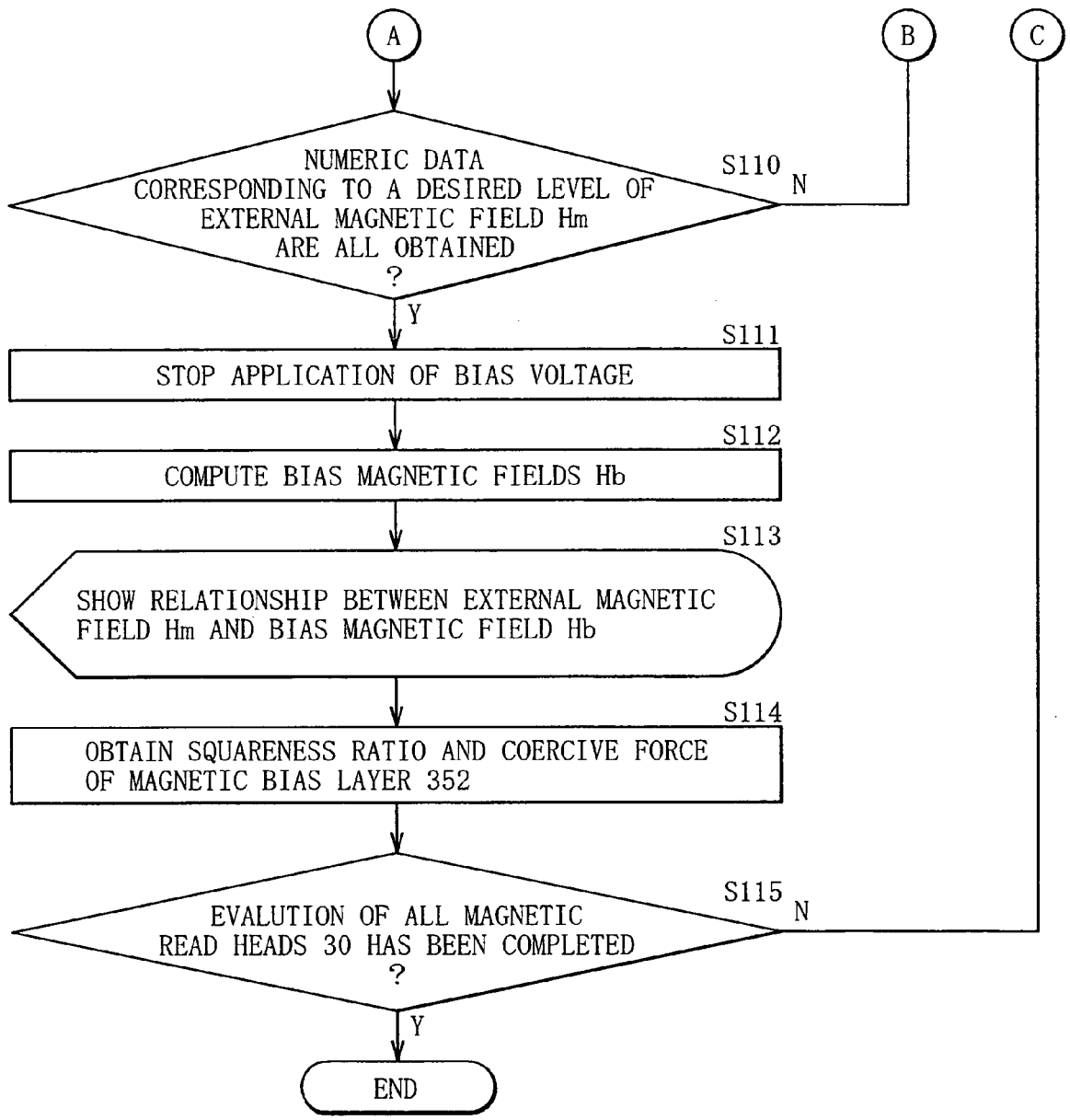
FIG. 4 is a flow chart explaining steps of the method subsequent to FIG. 3.

FIGS. 3 and 4 are flow charts representing a sequence of a method of evaluating the magnetic read head 30. FIGS. 5A to 5D are conceptual diagrams representing waveforms representing temporal change in the output voltage from the magnetic read head obtained at respective parts of the evaluation device of FIG. 1, or representing the frequency dependence thereof.

Here, as an example, a case in which magnetic bias layers 352 of plural magnetic read heads 30, which are formed to be juxtaposed on along a bar extending in one direction are evaluated sequentially will be described. First, the magnetic read head 30 at the endmost part of the bar is determined to be evaluated, and is disposed to a predetermined position in the magnetic field application section 11 (Step S101). At this time, one of the bottom shielding layer 32 and the top shielding layers 34 serving as electrodes for the magnetic read head 30 is connected to a probe located at the end of the lead wire L1 whereas the other end thereof is connected to a grounding conductor.

Next, the magnetic bias layer 352 is magnetized again as necessary (Step S102). This is for, since sometimes the magnetization direction of the magnetic bias layer 352 may fluctuate in unstable condition, performing stable evaluation by carrying out initialization thereof. When the remagnetization is to be performed, the power supplies 113 and 114 are driven with signals from the control unit 20 to apply direct currents I1 and I2, so that the induced magnetic fields H11A to H11D are generated by means of the four electromagnets 11A to 11D disposed in the magnetic field application section 11. In this manner, an external magnetic field H is applied to the magnetic bias layer 352 along a direction in which the magnetic bias layer 352 should originally generate the bias magnetic field Hb (for example, the track-width direction) (Step S103).

After applying the external magnetic field H for the remagnetization to the magnetic bias layer 352 for a given time, the external magnetic field H is removed (Step S104). Subsequently, a bias voltage of predetermined magnitude (constant value) is applied between the electrodes of the magnetic read head 30 (between the bottom shielding layer 32 and the top shielding layers 34) (Step S105). Specifically, the DC power supply 15 is driven with a signal from the control unit 20 so as to apply a direct current voltage via the lead wires L2 and L3. The magnitude of the direct current voltage may be approximately equal to the magnitude of that applied when reading information from a magnetic recording medium in an ordinary hard disk drive (HDD), for example. The reason such constant bias voltage is applied between the bottom shielding layer 32 and the top shielding layer 34 is that the ferromagnetic resonance frequency f0 of the magnetically free layer 45 is dependent on the applied bias voltage when strictly speaking.

Thereafter, the predetermined external magnetic field Hm is applied to the magnetically free layer 45, and the spectrum waveform of the magnetically free layer 45 is obtained with the spectrum analyzer 12 under a condition in which such a state is maintained (Step S106). Specifically, the magnetic field application section 11 is driven first with the signal from the control unit 20 as in the case of performing the remagnetization, and the external magnetic field Hm along the direction in which the bias magnetic field Hb is generated (for example, the track-width direction) is applied to the magnetic bias layer 352. Then, the spectrum waveform of the magnetically free layer 45 is obtained by sweeping the frequency under such state and measuring the fluctuation of the output voltage outputted from the magnetic read head 30.

Figure 5A:
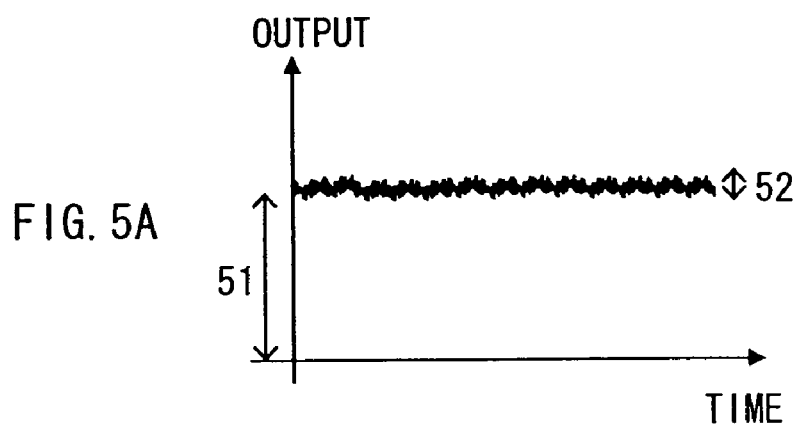
FIG. 5A is a conceptual diagram representing temporal change in the output voltage outputted from the magnetic read head and inputted into a wave formation section, in the device of evaluating magnetic read head of FIG. 1.
Figure 5B:
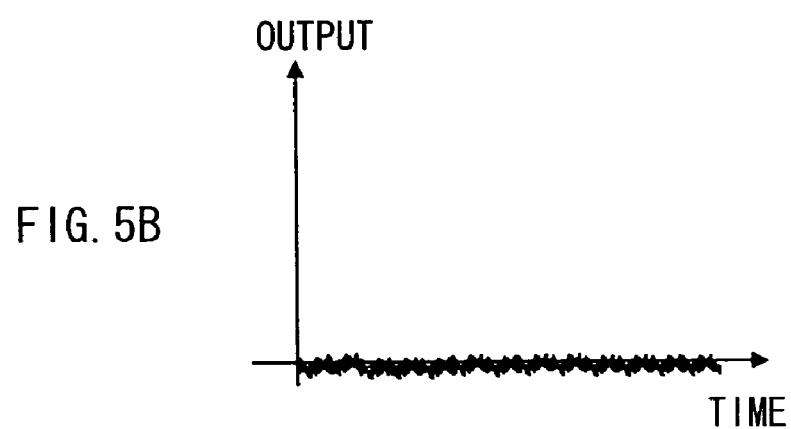
FIG. 5B is a conceptual diagram representing temporal change in the output voltage outputted from the magnetic read head immediately after passing through the waveform formation section, in the device of evaluating magnetic read head of FIG. 1.
Figure 5C:
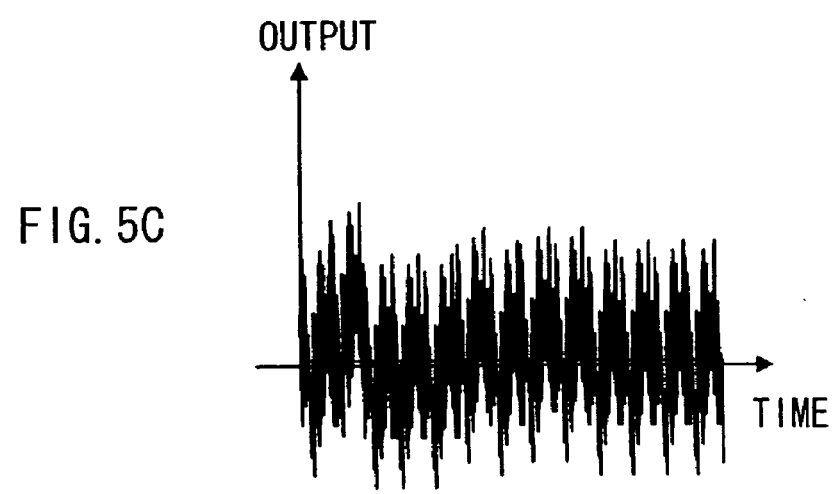
FIG. 5C is a conceptual diagram representing temporal change in the output voltage outputted from the magnetic read head immediately after passing through an amplifier, in the device of evaluating magnetic read head of FIG. 1.
Figure 5D:
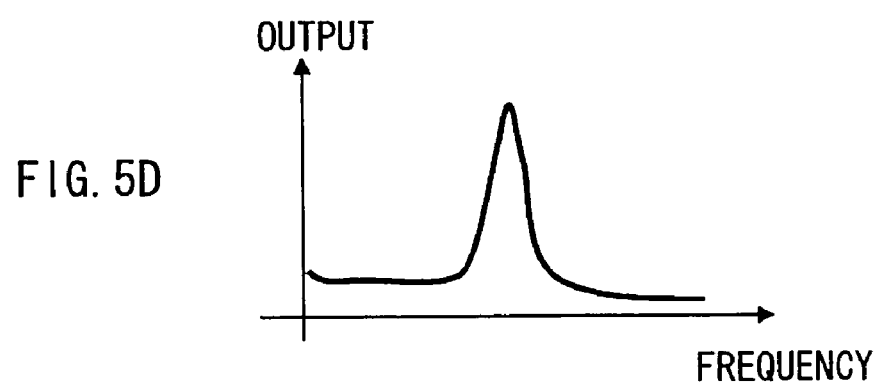
FIG. 5D is a conceptual diagram representing frequency dependence of the output voltage outputted from the magnetic read head, which is measured with a spectrum analyzer, in the device of evaluating magnetic read head of FIG. 1.

At that time, the voltage (observed noise voltage) caused by the ferromagnetic resonance is extremely small compared with the magnitude of the bias voltage applied to the MR element 31. FIG. 5A is a graph intelligibly representing the magnitude relationship between the bias voltage and the noise voltage caused by the ferromagnetic resonance. FIG. 5A conceptually represents the temporal change in the output voltage outputted from the magnetic read head 30, which is observed at any point between the magnetic read head 30 and the waveform formation section 13. In FIG. 5A, the abscissa represents time and the ordinate represents output voltage. Here, the output component denoted by reference numeral 51 corresponds to bias voltage (direct current voltage), and the output component denoted by reference numeral 52 corresponds to noise voltage caused by ferromagnetic resonance. In order to obtain the ferromagnetic resonance frequency f0 of the magnetically free layer 45, only the noise voltage caused by ferromagnetic resonance is needed. Accordingly, it is desirable to remove the direct-current component of the output voltage outputted from the magnetic read head 30 in the waveform formation section 13 first, and then further amplify that to about 50 times larger with the amplifier 14. FIG. 5B conceptually represents the temporal change of the output voltage outputted from the magnetic read head 30, which is observed immediately after passing through the waveform formation section 13. As indicated in FIG. 5B, the output component denoted by the reference numeral 51 (direct-current component) in FIG. 5A is removed by passing through the waveform formation section 13. Further, the temporal change of the output component denoted by the reference numeral 52 in FIG. 5A (the noise voltage caused by ferromagnetic resonance) becomes distinctive as illustrated in FIG. 5C by passing through the amplifier 14. Still further, the spectrum waveform of the magnetically free layer 45 is obtained as represented in FIG. 5D by converting the waveform of FIG. 5C into the relationship between output power (the noise voltage caused by ferromagnetic resonance) and frequency with the spectrum analyzer 12.

After obtaining the spectrum waveform of the magnetically free layer 45, application of the external magnetic field Hm is stopped (Step S107). Then, the ferromagnetic resonance frequency f0 of the magnetically free layer 45 is obtained from the peak position of the spectrum waveform (Step S108).

The obtained ferromagnetic resonance frequency f0 and the external magnetic field Hm corresponding thereto are stored as a set of numeric data in the data storing section 21 (Step S109).

Thereafter, the above-mentioned steps S106 to S109 are repeated to the extent in which a hysteresis loop that indicates the relationship between the ferromagnetic resonance frequency f0 and the external magnetic field Hm can be formed, thereby obtaining a plurality of sets of numeric data. After obtaining all the numeric data corresponding to the external magnetic field Hm of a desired level (Step S110), application of bias voltage is stopped (Step S111).

In the operation section 22, the bias magnetic field Hb that is applied to the magnetically free layer 45 by the magnetic bias layer 352 is computed according to a conditional expression (1), based on the numeric data stored in the data storing section 21 (Step S112). Here, values of the gyroscope constant γ, the saturation magnetic field Ms, and the shape anisotropy magnetic field Hk are measured in advance for a separately prepared sample having the same film thickness, planar configuration and component material as those of the magnetically free layer 45 used in the magnetic read head 30 to be evaluated.

After computing the bias magnetic fields Hb corresponding to all the ferromagnetic resonance frequencies f0, the hysteresis loop indicating the relationship between the external magnetic field Hm and the bias magnetic field Hb is outputted in the output section 23 (Step S113). Then, squareness ratio and coercive force of the magnetic bias layer 352 are obtained based on the hysteresis loop (Step S114).

Thereafter, the above-mentioned steps S101 to S114 are repeated in a similar manner as for the other magnetic read heads 30 formed on along the bar (Step S115). When measurement of squareness ratio and coercive force of the magnetic bias layer 352 has been completed for all the magnetic read heads 30, a series of evaluations for the magnetic read heads 30 is completed.

As described above, according to the present embodiment, it is possible to obtain the bias magnetic field Hb applied by the magnetic bias layer 352 with good reproducibility according to the conditional expression (1), based on the result obtained by directly measuring the ferromagnetic resonance frequency f0, which is a specific characteristic unique to the magnetically free layer 45. Accordingly, the magnetization curve of the magnetic bias layer 352 is obtainable more correctly and in a comparatively short time (for example, several minutes for one magnetic read head 30) without depending on other component elements such as the bottom shielding layer 32 and the top shielding layer 34. Namely, it is possible to evaluate the magnetic characteristics (measurement of squareness ratio and coercive force) of the magnetic bias layer 352 simply and with high precision.

According to the present embodiment, since the magnetic field application section 11 includes four electromagnets in which each electromagnet is configured of a core 111 and a coil 112 wound around the core 111 to generate the induced magnetic fields H11A to H11D, it is possible to apply the external magnetic field efficiently to the magnetic read head 30 in a desired direction while realizing a compact configuration. Furthermore, since the direct-current component corresponding to the bias voltage is removed from the output voltage outputted from the magnetic read head 30 in the waveform formation section 13 and then the output voltage from the magnetic read head 30 in which the direct-current component is cut is amplified by the amplifying unit 14, fluctuation of the noise voltage caused by the ferromagnetic resonance is measurable with more precision.

Next, examples of the present invention will be explained hereinbelow.

Experimental Examples 1-1 to 1-3

Figure 6A:
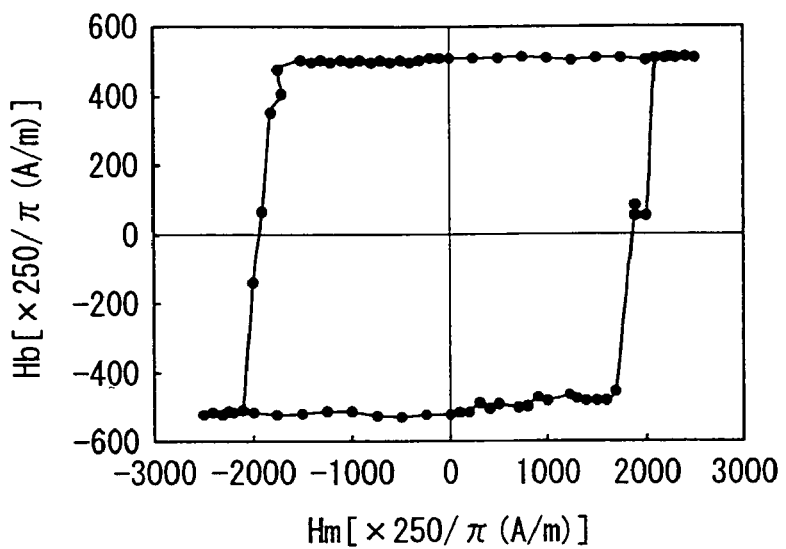
FIG. 6A is a first characteristic chart representing the magnetic characteristics of a magnetic bias layer included in the magnetic read head of FIG. 2.
Figure 6B:
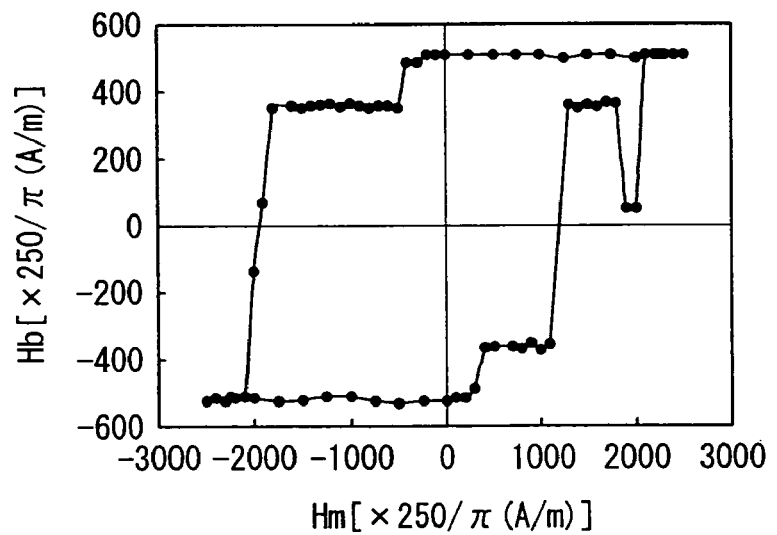
FIG. 6B is a second characteristic chart representing the magnetic characteristics of the magnetic bias layer included in the magnetic read head of FIG. 2.
Figure 6C:
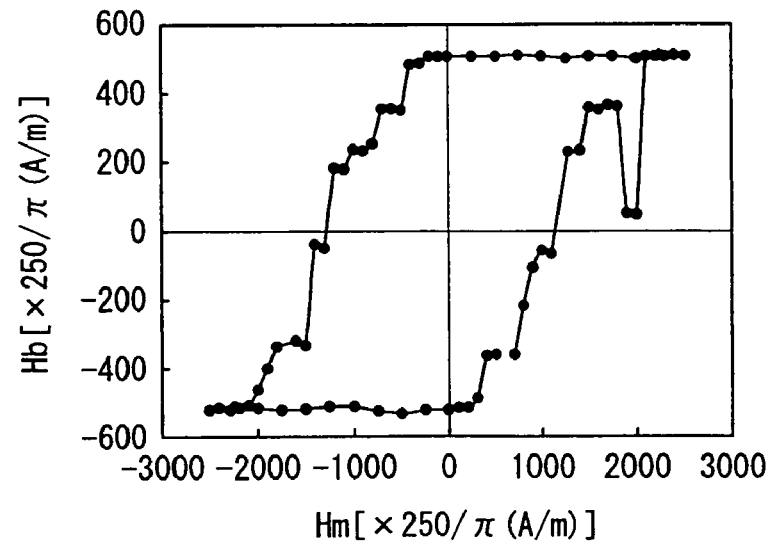
FIG. 6C is a third characteristic chart representing the magnetic characteristics of the magnetic bias layer included in the magnetic read head of FIG. 2.

A hysteresis loop that indicates the relationship between the external magnetic field Hm and the bias magnetic field Hb was measured for the magnetic read head having a cross section structure illustrated in FIG. 2, based on the method of evaluation as described in the above-mentioned embodiment, to evaluate the magnetic bias layer. The result is represented in FIGS. 6A to 6C. FIGS. 6A to 6C are the hysteresis loops for samples of mutually different magnetic read heads. In FIGS. 6A to 6C, the abscissa represents the external magnetic field Hm and the ordinate represents the bias magnetic field Hb.

FIG. 6A (Experimental Example 1-1) is a hysteresis loop having an ideal configuration, and it can be seen that the magnetic bias layer is formed in the most preferable state. The squareness ratio of the magnetic bias layer in this example is 1 and the coercive force is about 2000 Oe (It can be interpreted as about 159 kA/m).

FIG. 6B (Experimental example 1-2) represents that the magnetic bias layer 352 has a magnetic characteristic which is a little inferior to the sample of FIG. 6A but has no problem for actual use. On the other hand, FIG. 6C (Experimental example 1-3) represents that the magnetic bias layer 352 has a magnetic characteristic of a level problematic for actual use.

Experimental Example 2

Figure 7:
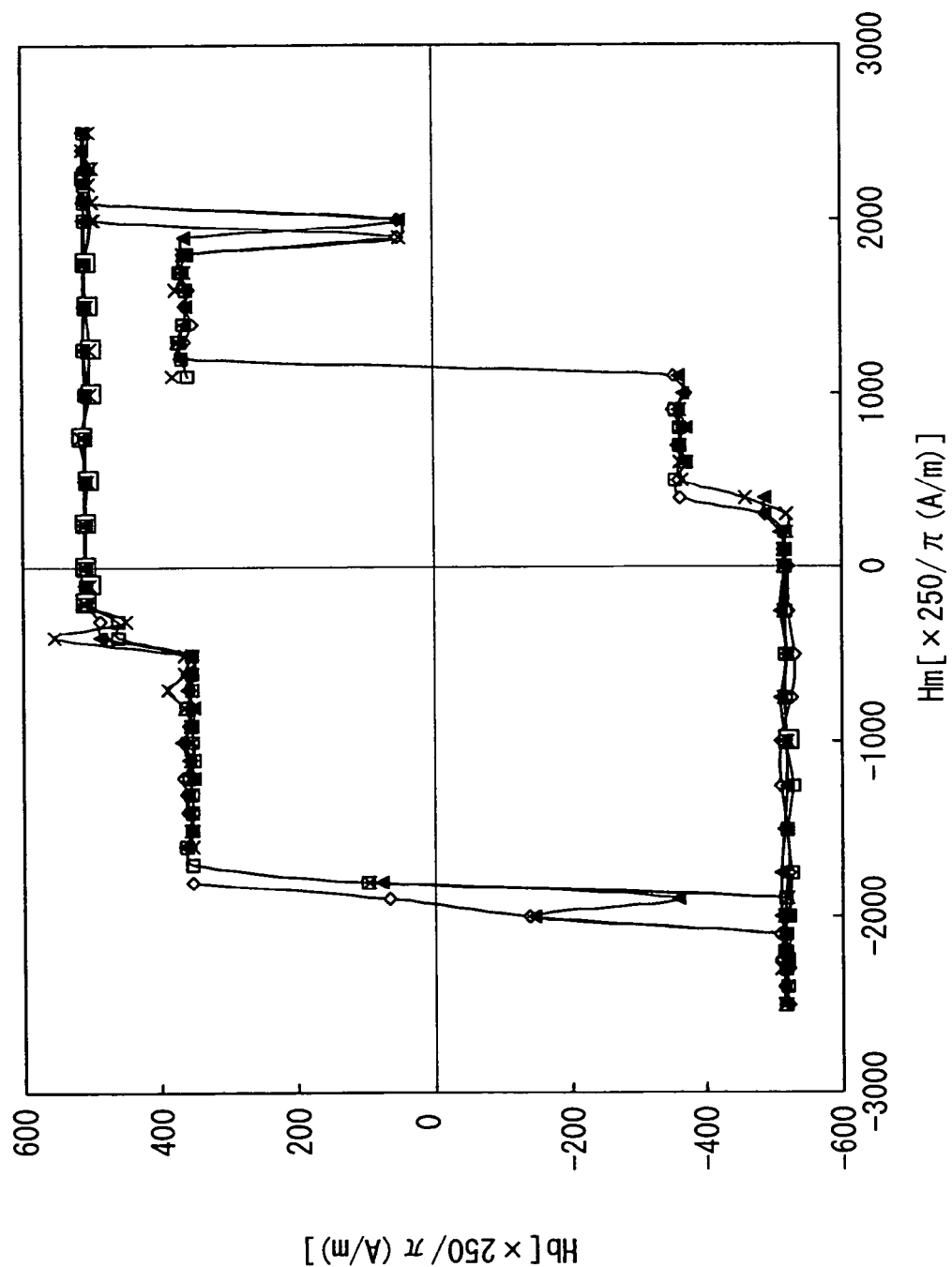
FIG. 7 is a characteristic chart corresponding to FIG. 6B, explaining about measurement error.

Next, the hysteresis loop was repeatedly measured three more times for the sample of the magnetic read head evaluated in the experimental example 1-2 (four times in total) to investigate fluctuation in the measured value. The result is represented in FIG. 7. As represented in FIG. 7, the four hysteresis loops were approximately overlapped each other in the present Experimental Example, and good reproducibility was obtained.

Thus, according to the present invention, it is confirmed that determination on quality of the magnetic characteristics of the magnetic bias layers can be conducted promptly and correctly.

Association of reference numerals and component elements in the present embodiment is indicated below.

10: measuring section, 11: magnetic field application section, 12: spectrum analyzer, 13: waveform formation section, 14: amplifier, 15: DC power supply, 20: control unit, 21: data storing section, 22: operation section, 23: output section, 30: magnetic read head, 31: magnetoresistive (MR) element, 32: bottom shielding layer, 33: gap adjustment layer, 34: top shielding layer, 35: magnetic domain controlling layer, 351: buffer layer, 352: magnetic bias layer, 36: insulating layer, 41: foundation layer, 42: antiferromagnetic layer, 43: magnetically pinned layer, 44: intervening layer, 45: magnetically free layer, L1, L2: lead wire, S1 to S3: signal line.

Although the present invention has been described with reference to the embodiment and examples, the invention is not limited to the embodiment and examples but can be variously modified. For example, in the above-mentioned embodiment, shape anisotropy magnetic field is measured in advance for the separately-prepared sample having the same film thickness, planar configuration and component material as those of the magnetically free layer used in the magnetic read head to be evaluated, so that the measured value is utilized as a shape anisotropy magnetic field of the magnetically free layer in the above-mentioned magnetic read head, although it is not limited thereto. For example, the magnetic bias layer may be temporarily demagnetized by using the magnetic field application section of the present invention so as to measure the shape anisotropy magnetic field of the magnetically free layer in the magnetic read head to be evaluated one by one.

Also, in the above-mentioned embodiment, though the CPP-GMR element is described as an example of the MR element, it is not limited thereto. The present invention is also applicable to a TMR element or CIP-GMR element.

In addition, in the above-mentioned embodiment, though description is made as to the case in which the evaluation device includes the output section that outputs the relationship between the external magnetic field and the bias magnetic field, it is not limited thereto. Namely, the mutually corresponding information signal of the external magnetic field and information signal of the bias magnetic field may be individually taken out from the evaluation device of the present invention, which may be transmitted to an external output section, so that the external output section may output information that indicates the relationship between the external magnetic field and the bias magnetic field.

What is claimed is:

1. A device of evaluating a magnetic read head having a magnetoresistive element including a magnetically free layer, and a magnetic bias layer that applies a bias magnetic field to the magnetically free layer, comprising:
   a measuring section measuring a ferromagnetic resonance frequency of the magnetically free layer under a condition of applying a predetermined external magnetic field to the magnetically free layer; and
   an operation section computing the bias magnetic field according to a conditional equation (1), $$Hb = \{(2*\pi*f0/\gamma)^2/Ms\} - (Hk + Hm) \quad (1)$$

where Hb is the bias magnetic field, f0 is the ferromagnetic resonance frequency of the magnetically free layer, γ is a gyroscope constant, Ms is a saturation magnetic field of the magnetically free layer, Hk is a shape anisotropy magnetic field of the magnetically free layer, and Hm is the external magnetic field applied to the magnetically free layer.

2. The device of evaluating the magnetic read head according to claim 1, further comprising an output section outputting a relationship between the external magnetic field and the bias magnetic field.

3. The device of evaluating the magnetic read head according to claim 1, wherein the measuring section includes:
   a magnetic field application section applying the external magnetic field to the magnetic read head; and
   a spectrum analyzer measuring a frequency dependence of an output voltage outputted from the magnetic read head.

4. The device of evaluating the magnetic read head according to claim 3, wherein the measuring section further comprises a waveform formation section between the magnetic field application section and the spectrum analyzer, the waveform formation section removing a direct-current component of the output voltage outputted from the magnetic read head.

5. The device of evaluating the magnetic read head according to claim 1, wherein the magnetic field application section includes four electromagnets separately disposed to surround the magnetic read head, each of the electromagnets being configured of a magnetic core and a coil wound around the magnetic core.

6. A method of evaluating a magnetic read head having a magnetoresistive element including a magnetically free layer, and a magnetic bias layer that applies a bias magnetic field to the magnetically free layer, comprising:
   measuring a ferromagnetic resonance frequency of the magnetically free layer under a condition of applying a predetermined external magnetic field to the magnetically free layer; and
   computing the bias magnetic field according to a conditional equation (1), $$Hb = \{(2*\pi*f0/\gamma)^2/Ms\} - (Hk + Hm) \quad (1)$$

where Hb is the bias magnetic field, f0 is the ferromagnetic resonance frequency of the magnetically free layer, γ is a gyroscope constant, Ms is a saturation magnetic field of the magnetically free layer, Hk is a shape anisotropy magnetic field of the magnetically free layer, and Hm is the external magnetic field applied to the magnetically free layer.

7. The method of evaluating the magnetic read head according to claim 6, including performing remagnetization of the magnetic bias layer by arranging a magnetization direction of the magnetic bias layer in one direction, before measuring the ferromagnetic resonance frequency of the magnetically free layer.

8. The method of evaluating the magnetic read head according to claim 6, wherein the ferromagnetic resonance frequency of the magnetically free layer is measured under a condition of applying a predetermined voltage to the magnetoresistive element.

9. The method of evaluating the magnetic read head according to claim 6, further comprising obtaining a squareness ratio and a coercive force of the magnetic bias layer, based on a hysteresis loop that represents a relationship between the bias magnetic field calculated according to the conditional equation (1) and the external magnetic field.

\* \* \* \* \*